United States Patent [19]

Ingram et al.

[11] Patent Number: 5,686,003
[45] Date of Patent: Nov. 11, 1997

[54] SHAPE MEMORY ALLOY DE-ICING TECHNOLOGY

[75] Inventors: Richard B. Ingram, Ithaca; Joseph J. Gerardi, Dryden, both of N.Y.

[73] Assignee: Innovative Dynamics, Inc., Ithaca, N.Y.

[21] Appl. No.: 254,229

[22] Filed: Jun. 6, 1994

[51] Int. Cl.$^6$ ........................................................ H05B 3/34
[52] U.S. Cl. .......................... 219/201; 219/528; 219/549; 244/134 D
[58] Field of Search ..................................... 219/200, 202, 219/528, 549; 244/134 A, 134 R, 134 D–134 F; 343/704; 15/250.05, 250.07, 256.5

[56] References Cited

U.S. PATENT DOCUMENTS

| | | | |
|---|---|---|---|
| 3,519,229 | 7/1970 | Gullberg | 244/134 R |
| 3,809,341 | 5/1974 | Adams et al. | 244/134 D |
| 4,411,711 | 10/1983 | Albrecht et al. | 148/11.5 A |
| 4,613,102 | 9/1986 | Kageorge | 244/234 A |
| 4,690,353 | 9/1987 | Haslim et al. | 244/134 D |
| 5,074,497 | 12/1991 | Phillips, II | 244/134 D |
| 5,129,598 | 7/1992 | Levin et al. | 244/134 R |
| 5,150,864 | 9/1992 | Roglin et al. | 244/219 |
| 5,429,327 | 7/1995 | Adams | 244/134 D |
| 5,489,073 | 2/1996 | Leffel et al. | 244/134 R |
| 5,558,304 | 9/1996 | Adams | 244/134 A |

FOREIGN PATENT DOCUMENTS

| | | |
|---|---|---|
| 60-164546 | 8/1985 | Japan . |
| 61-17615 | 1/1986 | Japan . |
| 61-122363 | 6/1986 | Japan . |
| 1-126124 | 5/1989 | Japan . |
| 4-103497 | 4/1992 | Japan . |
| 523108 | 7/1940 | United Kingdom . |

OTHER PUBLICATIONS

Gerardi et al, "AIAA 95–0454—A Shape Memory Alloy Based De–Icing System for Aircraft", 33rd Aerospace Sciences Meeting and Exhibit, Reno NV, Jan. 9–12, 1995.

Bond et al, "AIAA 93–0032—Results of Low power Deicer Tests on a Swept Inlet Component in the NASA Lewis Icing Research Tunnel", 31st Aerospace Sciences Meeting & Exhibit, Jan. 11–14, 1993.

Lewis, "De–icing Effectiveness of External Electric Heaters", Natl. Adv. Committee for Aeronautics, Tech. Note 1520, 1948.

"Shape Memory–Alloy–Based Deicing System Developed", WWW, http://www.lerc.nasa.gov/WWW/RT1995/20002720b.htm.

Primary Examiner—Teresa J. Walberg
Assistant Examiner—Raphael Valencia
Attorney, Agent, or Firm—Pennie & Edmonds LLP

[57] ABSTRACT

A new deicing technology is described which utilizes the actuating properties of shape memory alloys (SMAs) to debond ice accretion formed on a surface. A thin sheet of SMA material is mounted to the icing prone surface to perform the force and displacement combination that can debond the ice. The SMA sheet is activated to expand or contract causing shearing and peeling of the ice. An SMA actuator portion located aft of the icing area can be used to pull the sheet over a ribbed underlay and grooved bands which generates a strain field that severs the ice's adhesive bond. Two-way shape memory action and natural ice latent heat powering are used in different modes of operation to reduce the power requirements and the structural complexity of the deicing system.

25 Claims, 5 Drawing Sheets

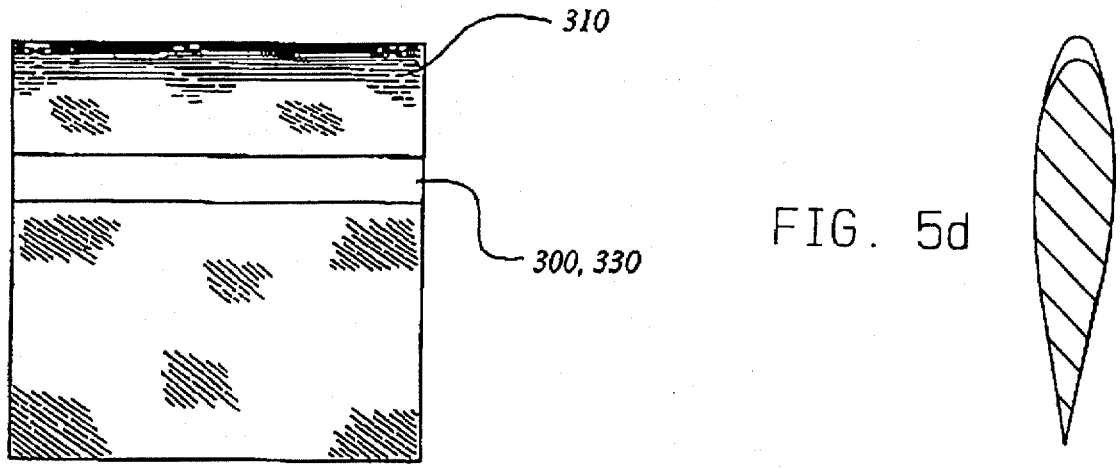
FIG. 5a
FIG. 5d
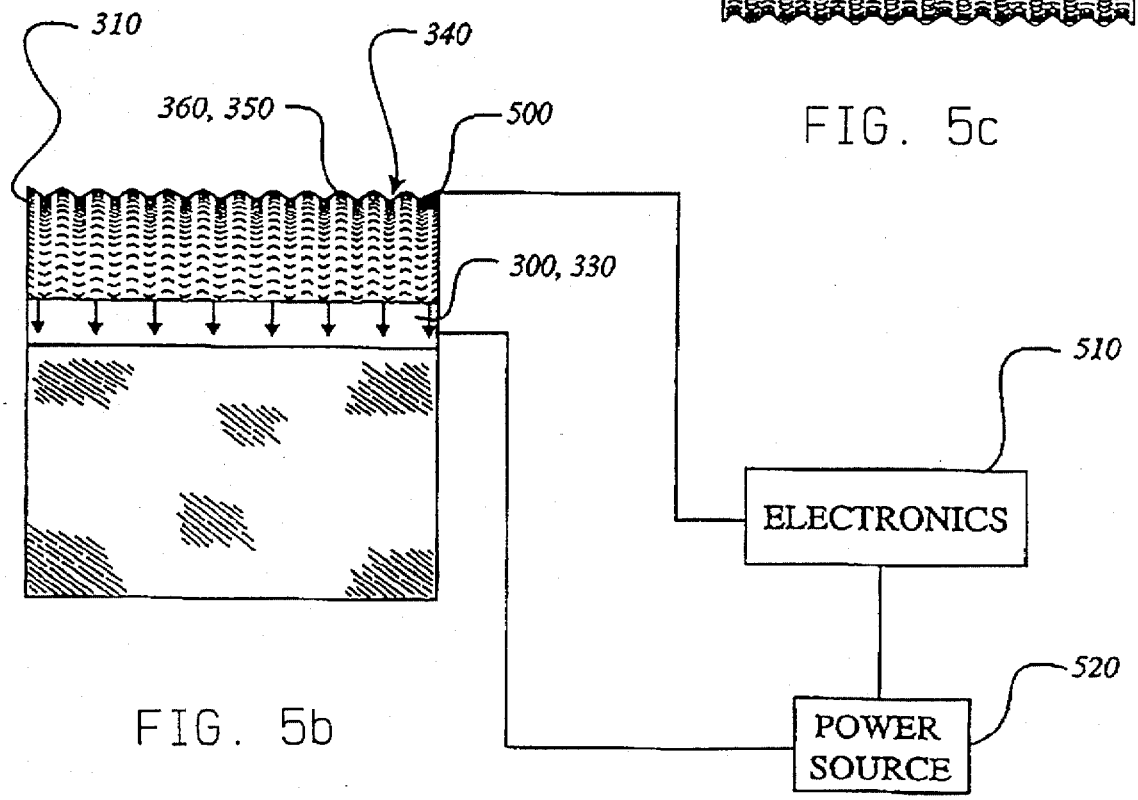
FIG. 5c
FIG. 5b

SHAPE MEMORY ALLOY DE-ICING TECHNOLOGY

STATEMENT REGARDING GOVERNMENT FUNDED RESEARCH

This invention was made under Government support under Contract No. NAS3-26612 awarded by the National Aeronautics and Space Administration. The Government has certain rights in this invention.

TECHNICAL FIELD

The present invention relates to de-icing systems and, more particularly, to de-icing systems which utilize shape memory alloys (SMAs).

BACKGROUND OF THE INVENTION

Aircraft icing is known to occur on the aircraft exterior surface when the aircraft is airborne as well as when the aircraft is stationary on the ground. Aircraft icing generally occurs on the leading edges of the airfoil when the surface temperature is at or below freezing. Unfortunately, this can occur at any time of the year when there is moisture or precipitation and when the aircraft is at or above the freezing altitude. Such aircraft ice formation or accretion can have deleterious effects on flight performance. Undetected airborne icing can contribute to catastrophic crashes and today threatens general aviation.

In the prior art, several de-icing and anti-icing systems have been developed to combat the general problem of aircraft icing. De-icing and anti-icing systems differ in their method of operation. At present, two types of anti-icing systems are currently in use. Each type heats the ice prone surfaces to a temperature sufficient to prevent the formation of ice. One type uses the exhaust gas of the aircraft as the heat source whereas the other uses an electrical resistance heater.

Although these anti-icing systems are reliable, they generally consume a great deal of energy in operation. Attempts to minimize the energy consumption by melting the ice periodically, rather than continuously, often leads to runback re-freeze, a condition whereby water from the melting ice flows to adjacent areas on the airfoil and refreezes.

De-icing systems, unlike anti-icing systems which prevent the formation of ice, mechanically remove the ice accretion from the surface of the aircraft. They generally exist in the form of pneumatic or electro-magnetic impulse actuators.

Pneumatic systems utilize inflatable rubber bladders such that when they expand, ice is sheared, cracked and flaked off. The actuator part of the device is installed as a thin cap (a boot) that covers the ice prone area. Rubber pneumatic de-icer boots are widely used, but are unfortunately prone to damage from weather and foreign objects. Further, they cannot remove thin layers of ice less than ¼". One alternative pneumatic system under development utilizes a high pressure pneumatic pulse that causes the icing surface to move with a high acceleration and low displacement. Although attractive this type of system cannot be retrofitted to current fleet aircraft and is not easily adapted to small radius surfaces such as those used on helicopter rotorblades.

Electro-magnetic type de-icing systems have also been widely investigated. See, for example, U.S. Pat Nos. 4,690,353 and 5,129,598. They perform in the same manner as the above impulsive pneumatic system. They, however, are capable of removing very thin layers of ice. While their performance is generally superior to pneumatic de-icers, these systems lack sufficient durability for long-term use in hostile aircraft environments.

In sum, present de-icing systems for aircraft generally exhibit limited performance and durability in the hostile environment unique to the airfoil of an aircraft. Constraints, including negligible mechanism space, high structural static/dynamic loads, and low power requirements, further limit the design freedom for present de-icing systems. With the increased readiness and safety demands being made on aircraft, it is highly desirable to develop a new aircraft de-icing technology having all-weather, high-performance de-icing capabilities.

SUMMARY OF THE INVENTION

The invention is a deicing system that utilizes the unique properties of shape memory alloy materials. As is well known in the art, shape memory alloy (SMA) materials exhibit the ability to transform shape and create force through a martinsitic phase transformation when an appropriate amount of energy is applied to the material. This energy is typically applied by external heating or direct resistive heating of the SMA material itself. The deicing system of the present invention utilizes these SMA materials to mechanically manipulate a surface to remove ice through unique methods of surface bending, shearing, pealing, acceleration, or deceleration. Advantageously, SMAs can perform an actuating function with very low size and weight specifications.

In one embodiment, a thin sheet of SMA material is mounted to the icing prone leading edge surface of an aircraft or a rotorblade to perform the force and displacement combination that can debond ice. After allowing a small amount of ice to build up, the SMA sheet is activated to shrink like a piece of rubber, shearing and peeling the ice off into the air stream.

In another preferred embodiment, the deicing system includes a SMA actuator and a SMA sheet. The SMA actuator stretches the SMA sheet to achieve the ice de-bonding action. The SMA actuator portion and the SMA sheet preferably are formed from the same SMA material. The SMA actuator is located aft of the icing area and when it is activated (by heating), it pulls on the SMA sheet. When the SMA sheet is under tension, it is forced over a ribbed underlay and grooved bands (riblets) which causes a complex strain field that severs the ice's adhesive bond. Advantageously, air can pass under the ice through the grooves which further weakens any tendency of the ice to cling to the SMA sheet. The forming riblets act to pull the SMA sheet away from the ice in a peeling action which contributes greatly to the effectiveness and reliability of the ice de-bonding action. The riblets can be made to form in either the chordwise or the spanwise direction. The severed ice mass can be expelled by natural forces as in the case of propellers and rotorblades, by natural aerodynamic forces, or by an additional mechanical system. Advantageously, in fixed-wing applications the use of an electro-thermal parting strip located at the stagnation line could be employed to improve the aerodynamic shedding performance. The most common SMA material, a nickel-titanium (NiTi) alloy, possesses a high combination of corrosion, erosion, and abrasion resistance, and for these reasons alone, it is ideally suited for service as a leading edge erosion shield material.

In another preferred embodiment, the SMA actuation heat is generated naturally by the latent heat of fusion produced by the phase transformation of the accreting ice from liquid to solid. SMAs are available which have a transformation temperature range that coincides with the icing temperature range. The SMA sheet can be installed over an icing prone surface, debonding ice at most ambient temperature levels in the icing spectrum. In the event that not enough natural heat is available, an electrical resistance heating system can provide the additional activation power. Since the needed temperature increase is modest, the power requirement of this mode of operation is low. The overall string movement for such a system is modest and such a design can function with little change in the airfoil's profile, averting detrimental effects.

Another preferred embodiment of the deicing system uses a process that converts the SMA actuator material to perform both the expansion and the contraction portions of the cycle while being driven by temperature changes alone. This is known as the built-in (two-way) shape memory action by those skilled in the art. Otherwise, the shape memory material can only perform cyclic movements provided that an outside mechanism, relative to the SMA member, is present to re-strain it when it is in its soft state, to initiate each new cycle. Once the SMA is so processed, it can be heated to draw on the SMA sheet to form the riblets or to directly shear the ice.

BRIEF DESCRIPTION OF THE DRAWINGS

A more complete understanding of the invention may be obtained by reading the following description of illustrative embodiments of the invention in which like elements are labeled similarly and in which:

FIG. 5a, b, c and d depict the de-icing system of FIGS. 3a and b with an ice accretion sensor system.

FIG. 5(a) is a side view of a wing in which the SMA sheet is in an inactive state.

FIG. 5(b) shows in a semi-block diagram form the active state of the sheet, and its connections to the electronics and the power source.

FIG. 5(c) illustrates a frontal view of the wing shown in FIG. 5(b).

FIG. 5(d) is a cross-section side view of the wing with an active state SMA sheet.

DETAILED DESCRIPTION OF THE INVENTION

The present invention is based on the realization that the mechanical actuating properties of shape memory alloys (SMAs) may be utilized to effectively debond ice, for example, from the leading edges of aircraft airfoils. Also, integrating SMAs within the leading edge of a rotor blade can prevent dangerous ice accretion, without greatly increasing a craft's weight, energy consumption, or drag. In particular, SMAs' unique property to abruptly change shape as a function of localized temperature advantageously provides the necessary shear or actuating force to debond accreted ice.

Several alloys and polymers are known to exhibit shape memory properties. SMAs exhibit the property of "remembering" a preset or "stored" shape, even after the material is severely deformed into a different shape. The shape memory recovery is induced by the application of heat, such as from an electrical heater, and can be triggered at a preset temperature that is determined by the particular alloy composition. Transformation temperatures between −100° C. and +100° C. are possible. The rate at which the recovery can occur is limited by how fast heat can be applied.

Although the SMA employed in the present invention is a Nickel Titanium alloy (NiTi or NiTiNOL), other SMAs may be used. SMA materials are available from Special Metals located in Utica, N.Y. and from Shape Memory Applications located in Sunnyvale, Calif.

Figure 1:
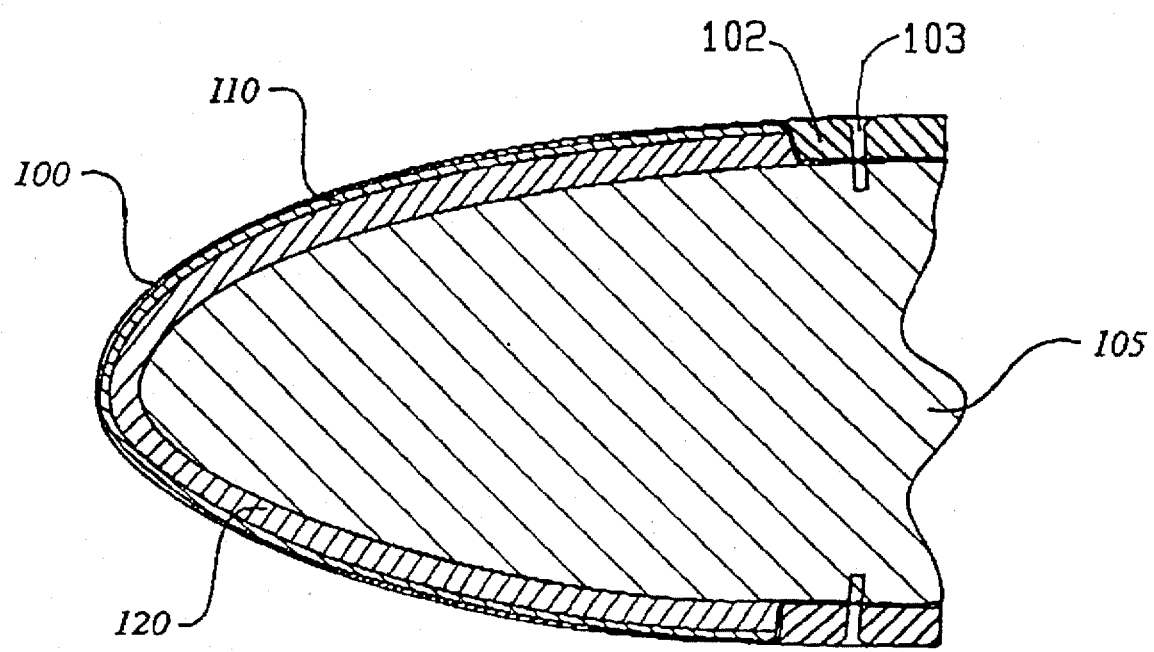
FIG. 1 depicts a sectional view of a first embodiment of the present deicing system.

FIG. 1 depicts a preferred embodiment of the present invention. In this active design, a thin sheet 100 of SMA (NiTi) is mounted over the leading edge surface 105 of an aircraft, with an electric heating layer 110 and highly compressible and pre-loaded polymer 120 interposed therebetween. Once ice accretion is detected on the surface of SMA sheet 100, electric heating layer 110 thermally heats the SMA to its transformation temperature so as to return to its undeformed or stored shape. In particular, SMA sheet 100 contracts and moves towards the airfoil, further compressing polymer 120. Upon cooling, pre-loaded or pre-strained polymer 120 expands SMA sheet 100 with sufficient force away from the airfoil to its deformed shape. Although SMA sheet 100 when heated contracts with many thousands psi of force, only approximately half of that is required to restrain the SMA to its deformed shape. To ensure compression of polymer 120 in the active state of the system, the back end of sheet 100 is secured to the surface 105, as known in the art. In a specific embodiment of the present invention shown in FIG. 1, a hold down plate 102 attached to the surface 105 using a locking screw 103 can be used to for that purpose. In a preferred embodiment of the present invention sheet 100 is approximately 5 mil thick, flexible resistance heater 110 is approximately 10 mil thick, and polymer 120 is made of closed cell soft silicone foam approximately 62 mils thick.

In operation, the SMA sheet contracts upon warm-up and the nose region moves towards the air foil compressing foam 120. Upon cooling, the SMA sheet expands away from the nose. This shearing action debonds the ice either on warm up or cool down. The heated, deiced portion covers roughly 10% chord and the back edge is at 16% chord.

The tensile or compressive strain required to break the ice adhesive bond is about 0.1% and varies depending on the composition of the surface and the ice accreted on it. For example, experimental evidence shows that a NiTi SMA surface requires less tensile strain than most materials now in use. A strain of 0.3%, which can be achieved by all the embodiments described herein, is sufficient to shear off the various forms of ice that may accrete on the surface of an aircraft with a sufficiently wide margin of safety.

Figure 2:
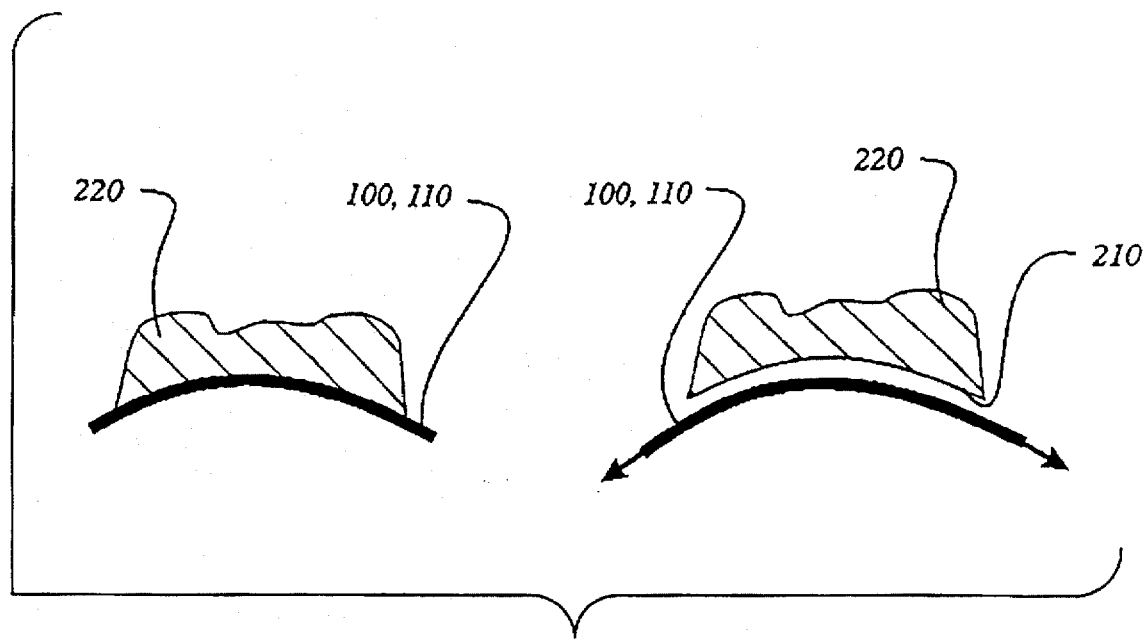
FIG. 2 depicts the sheafing action of the SMA sheet shown in FIG. 1.

To better understand the debonding mechanism of the present invention, it is helpful to refer to FIG. 2 which illustrates the shearing action. As SMA sheet 100 contracts, as shown on the right hand side of FIG. 2, a shearing action 210 is developed between ice accretion 220 and SMA sheet 100 thereby causing ice accretion 220 to peel off into the air stream. Results from experimental practice indicate that shear strains between 0.1–0.3% are sufficient to debond the ice accretion from the surface of SMA sheet 100. Once the ice accretion has been removed, electric heating layer 110 is deactivated and SMA sheet 100 cools to the ambient air temperature.

In the active design, the transformation temperature is chosen to be sufficiently higher than the ambient air temperature, such as 140° F. Further, SMA sheet 100 is approximately 2–10 mils thick, with the exact thickness dependent on the desired application. For these sheet thicknesses, experimental results also indicate that the required debonding strain does not detrimentally change the profile of the airfoil.

SMAs in their elementary form cannot return unassisted to their deformed shape, i.e., one way actuation. That is, SMAs typically cannot both contract and expand. They can, however, perform cyclic movements provided that an outside mechanism relative to the SMA is present to re-strain. In the above active design, highly compressible polymer 120, such as silicone, effects this expansion.

In another preferred embodiment of the present invention, SMA sheet 100, however, can be formed from SMA materials processed to exhibit both expansion and contraction visa vis temperature changes alone, known as a "two-way shape memory action." In that case, it is not necessary to use a restraining mechanism, such as polymer 120 because SMA sheet 100 once cooled would return to its deformed shape and expand away from the airfoil. A two-way action processing for SMAs is disclosed U.S. Pat No. 4,411,711, which is incorporated herein by reference. Thus, once SMA sheet 100 is appropriately processed, it can be heated to its transformation temperature so as to contract and shear the ice accretion. Then, it can be cooled to return to its deformed shape, substantially unassisted.

It is contemplated that the above active designs can be used on both airfoils of aircraft and blades of rotorcrafts. For example, the above SMA deicing system can be installed on the leading edge of a rotorcraft blade. In particular, SMA sheet 100 can be wrapped around the rotor leading edge to the ~15% forward chord position over an underlying structure thereof. An electro-thermal heater strip running the entire length of the rotorblade, either in segments or as a continuous strip, can be positioned under SMA sheet 100. Advantageously, the use of, for example, a NiTi SMA sheet provides an extremely durable leading edge material well-suited for the hostile environment of rotorcraft blades.

In another embodiment, the actuation heat required to drive SMA sheet 100 to its transformation temperature is generated internally from the latent heat of fusion produced by the liquid-to-solid phase transformation of the ice accretion. Indeed, results from experimental practice indicate that the latent heat released during icing can increase the surface temperature by more than 25° F. In such a passive design, the transformation temperature of SMA sheet 100 is judiciously chosen to coincide with the icing temperature range, typically between −10° F. and 40° F. Also, both one- and two-way SMAs may be used in this passive design, as discussed above. While the latent heat may not be sufficient to generate a strain of ~3%, as when an electro-thermal heater is used, the typical 0.1–0.2% strain generated is, however, sufficient to debond most types of ice accretion. If the latent heat of fusion is not sufficient, electric heating layer 110 can supplement the activation power. For example, at higher temperatures, such as those near 32° F., there is only a small temperature elevation and thus, electric heating layer 110 is required to further activate SMA sheet 100 to effect debonding. However, because most, if not all, of the required activation heat is obtained from the latent heat of fusion, the power requirement for this mode of operation is low.

Those skilled in the art will readily note that in operation the above passive de-icing system works on partial shape memory cycles that occur anywhere across the temperature range of icing. Moreover, because SMA sheet 100 has a low transformation temperature, the de-icing system will always be activated when the aircraft is operating in freezing temperatures.

Figure 3C:
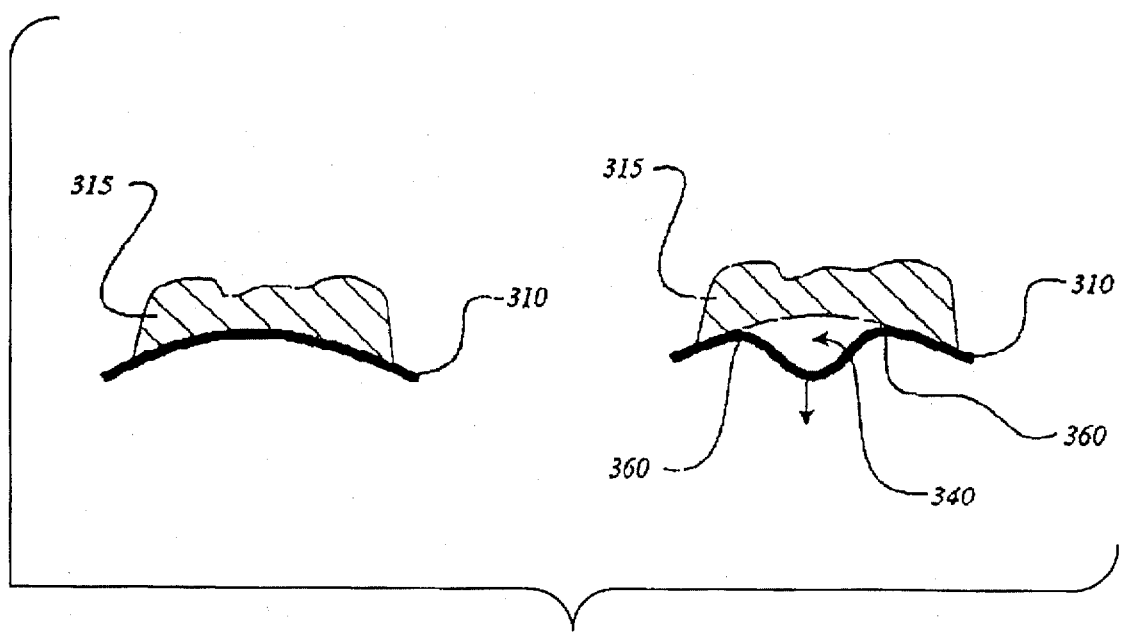
FIG. 3c depicts the sheafing action of the SMA sheet of the deicing system shown in FIGS. 3a and b.
Figure 3A:
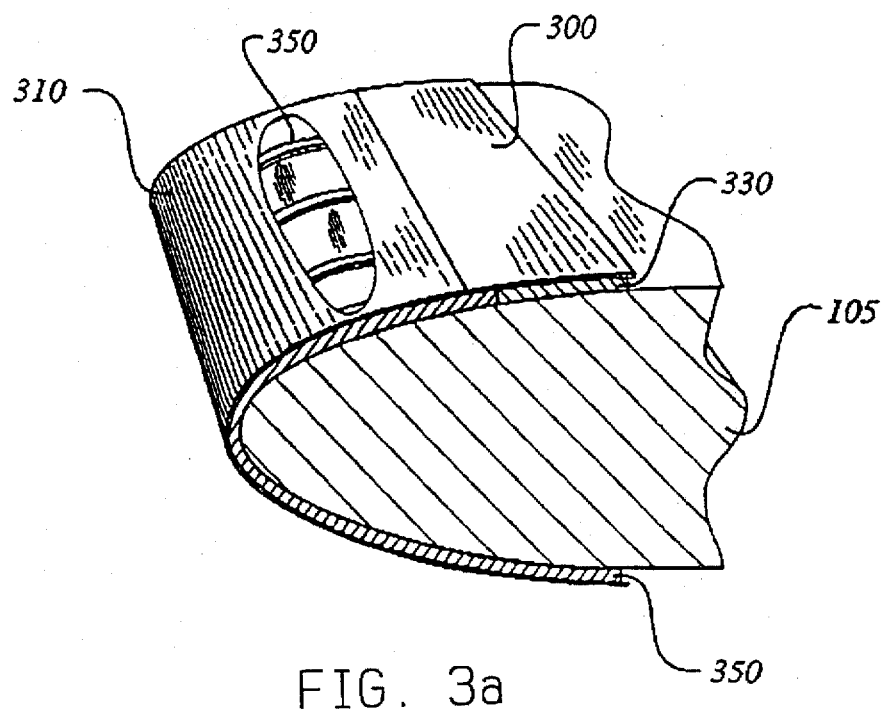
FIGS. 3a and b depict a second embodiment of the deicing system having a chordwise running ribbed underlay support structure in the relaxed and activated states, respectively.
Figure 3B:
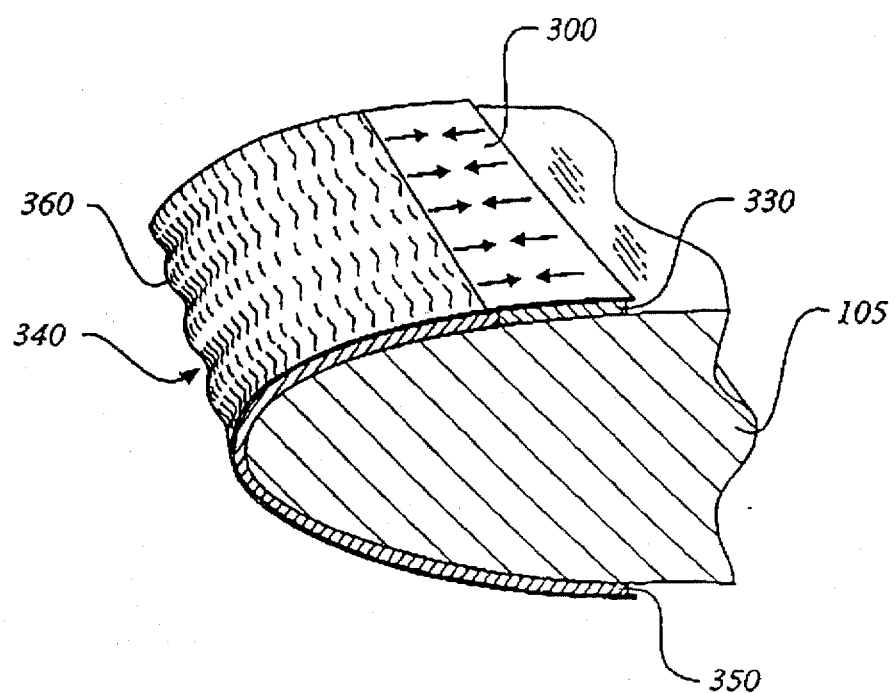

In another embodiment, ribbed distortions in the surface contour, called riblets, are actuated through SMAs to effect the debonding of ice accretion. Referring to FIGS. 3(a) and 3(b), a SMA actuator 300 is used to pull and stretch a SMA sheet 310 that is formed over a ribbed underlay structure 350. Preferably, SMA actuator 300 and SMA sheet 310 are fabricated from a single sheet of SMA material, such as NiTi. For example, SMA material can be rolled into a sheet form, and then subsequently processed to convert a region thereof into SMA actuator 300. Alternatively, SMA sheet 310 can be trained to recover to an undeformed ribbed structure, thereby obviating the need for the ribbed underlay structure. Further, both one way and two way SMA sheets may be used.

SMA sheet 310 is located on the leading edge of the airfoil, whereas SMA actuator 300 is located a distance back to limit its exposure to icing. When SMA sheet 310 is stretched by SMA actuator 300, as shown in FIG. 3b, it pulls back much like heat-shrinking plastic. As SMA sheet 310 moves away from the ice accretion, it fills in grooves 340 created by ribbed underlay structure 350. In this manner, leading edge riblets 360 are formed which advantageously shear and peel away from the ice accretion, allowing air pressure to infiltrate under the ice and lift it into the air stream. FIG. 3(c) illustrates the sheafing action caused by the formation of riblets 360 and the creation of air pockets between the ice accretion 315 and grooves 340.

An electro-thermal heater strip 330, selectively supplies heat to SMA actuator 300. Electrical current is applied directly to heater strip 330 to elevate the temperature of SMA actuator 300 to its transformation temperature. Alternatively, electrical current may be applied directly to SMA actuator 300, thereby obviating the need for heater strip 330. Still further, SMA sheet 310 can be directly heated across its surface to contract, obviating the need for SMA actuator 300.

Upon reaching the transformation temperature (martinsitic to austenitic transition temperature) of SMA actuator 300, SMA actuator 300 contracts up to 3% strain in which it pulls and correspondingly stretches SMA sheet 310 over ribbed underlay structure 350. It is contemplated that the alloy composition of SMA actuator 300 is chosen to have a transformation temperature that begins at ~120° F.

For a SMA sheet mounted on a NACA 0012 5.25" chord rotorblade and extending to approximately a 15% chord, it is contemplated that a sheet thickness of 2–10 mils is required. Further, only 8 mils of actuator displacement is needed to contract SMA sheet 310 so as to form riblets 360, typically on the order of 4 mils deep with a crest to crest riblet separation of about 0.25 inches.

With such a deformation pattern, an average strain distribution of 0.5% is attained, which is considerably higher than the required ice de-bonding strain of 0.1%.

Figure 4A:
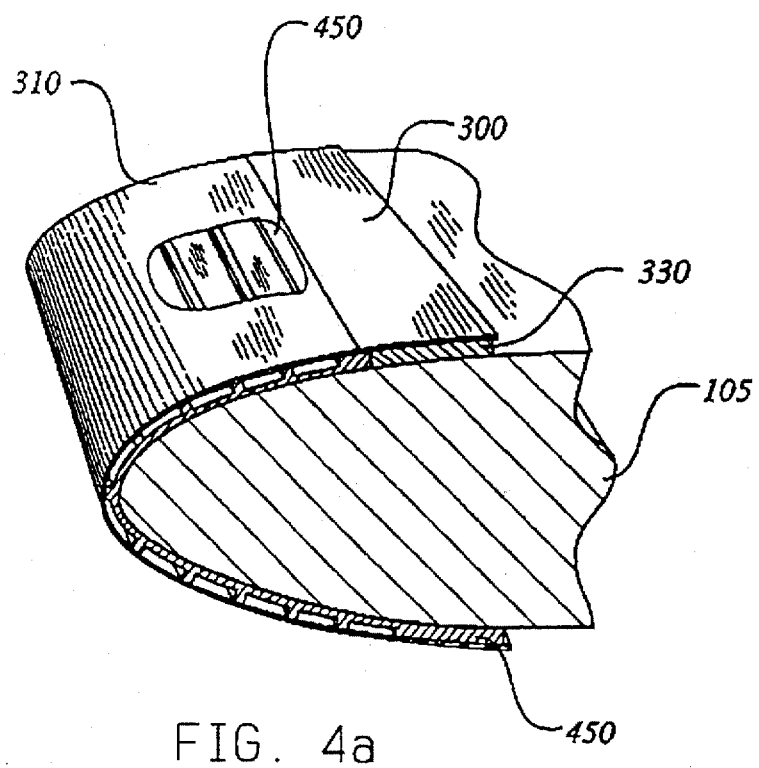
FIGS. 4a and b depict the deicing system of FIGS. 3a and b with a spanwise running ribbed underlay support structure in the relaxed and activated states, respectively.
Figure 4B:
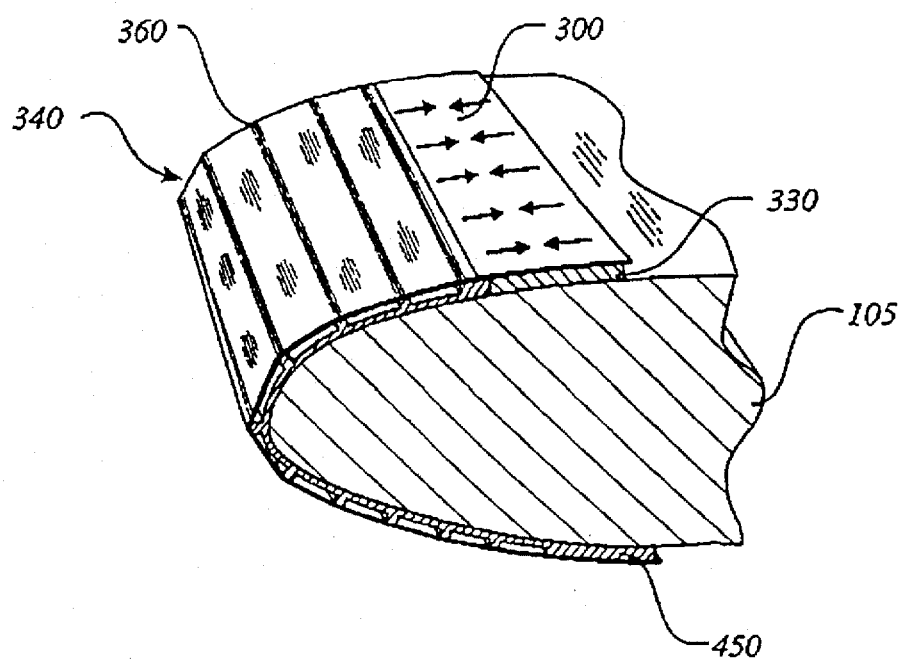

Those skilled in the art will readily note that the formation of riblets 360 aids in the ice debonding, lowers the required activation force, and also allows the system to be visually inspected for functionality since the degree of riblet formation can be determined by sight. Further, riblets 360 can be formed to run chordwise or spanwise, depending on the orientation of ribbed underlay structure 350. For example, FIGS. 4a and b depict a de-icing system similar to that of FIG. 3, except that ribbed underlay structure 450 runs spanwise. A spanwise direction may be advantageous in some applications where a better defined spanwise cracking is required to peel the ice accretion into the air stream, or where a spanwise motion, such as in a rotorcraft blade, assists the ice accretion in sliding off. Also, a spanwise configuration may work better than a chordwise arrangement when stiffer SMA sheets are used.

It is also contemplated that SMA actuator 300 can be fabricated in the form of wires. Preferably, the SMA wires are made to coincide only with the areas between the ribs of the ribbed underlay structure 350. In that manner, riblets 360 form more efficiently since the lines of force only pass through the region where they mechanically have the most effect. This is especially effective at aft positions of the de-icing area where a higher SMA sheet tension is required to fully form the riblets. Also, drilling holes in the SMA actuator just aft of the ribbed section will achieve the same advantages as the use of SMA wires, if the holes are of the same diameter as the ribs or wider.

Illustrated in FIGS. 5(a–d) are different perspective views of the system in FIGS. 3(a) and 3(b), also showing in a semi-block diagram form connections to a sensor system comprising sensor 500, electronics 510 and power source 520. Sensor 500 detects ice accretion, and sends signals to be processed by electronics 510. When ice accretion reaches a set limit, the system is activated by connecting power source 520 to electric resistance heater 330, thereby heating SMA actuator 300. Sensor 500 may be any of the well known ice detection sensors, such as those disclosed in U.S. Pat. No. 5,191,791, which is incorporated herein by reference. FIG. 5(a) illustrates a side view of a wing in which the shape memory alloy (SMA) sheet is in an inactive state. FIG. 5(b) illustrates the active state of the SMA sheet, and also shows in a diagram form the connections to the electrodes 510 and the power source 520, required to activate the sheet. FIG. 5(c) illustrates a frontal view of the wing shown in FIGS. 5(a) and 5(b) in which the SMA sheet is activated. Finally, FIG. 5(d) is a cross-section view of the wing in which the contraction/expansion of the SMA sheet is illustrated from a different perspective.

It is also contemplated that the above de-icing system may use other types of actuators, such as pneumatic, electromechanical or electrothermal actuators.

When the SMA actuator cools, it expands (either through a restraining mechanism or the two way action), releasing the tension on SMA sheet 310 and causing the riblets to disappear. The required SMA actuator stress output is an exponential function of rib spacing and SMA sheet thickness. The riblet forming design diminishes the actuator stress output required to achieve a given ice de-bonding strain level, typically by a factor of 5 to 10 as compared to a system which uses a smooth underlay.

Preferably, a two-way effect SMA actuator is used since it allows a much more effective riblet forming design to be achieved. First, it minimizes the need for pre-tensioning SMA sheet 310 to provide a restraining mechanism. Second, two way effect SMA actuators minimize the use of any other mechanism or laminate layer required to perform the restraining action.

For SMA actuator 300 formed of NiTi, an estimation of the power requirements indicates that an energy per mass value of 40 cal/gm is needed to completely transform the SMA from martinsite to austinitc. For example, for every chordwise inch width of a 3 mil thick SMA sheet from which also the SMA actuator is constructed of in the adjacent material, a chordwise actuator width of ⅓ inch is required. This includes a safety factor of 2, i.e., the actuator is capable of moving twice the minimum distance needed to form the ribs and de-ice. For energy comparisons with other systems, every square foot of de-icer area (SMA sheet 310) will require a ⅓ square foot section of activated SMA actuator 300 for a 3 mil thick SMA sheet. This quantity has a volume of 0.144 inch$^3$ (2.36 cm$^3$) which has a mass of 15.2 gm. Assuming 167 Joule/gm of SMA activation energy, a figure of 2540 J per square foot of SMA sheet 310 will be required. If the actuator is heated in 10 seconds, 254 W/ft$^2$ are needed. This figure is to be compared with the 3600 W/ft$^2$ (25 W/in$^2$) typically required for electrothermal de-icers.

The energy savings is significant in aircraft applications that typically require several kilowatts of power for propellers, engine inlets, and horizontal stabilizer de-icers. This energy savings results from phase changing the SMA material to perform work in lieu of phase changing the ice to water. The energy requirements can be further reduced by minimizing the cross sectional area of the SMA actuator. The above actuator needs to exert about 6000 psi of output force. The actuator is capable of exerting several times this number and it is therefore stronger than is needed. The cross sectional area of the actuator can be minimized by stamping out elongated ovals to create wirelike members (or using SMA wires) that run between the SMA sheet and the anchoring point aft of the SMA actuator. With this strategy, less SMA material needs to be heated to perform the de-icing operation.

For the riblet embodiments above, the transformation temperature range is set at a level that is above the aircraft's maximum ambient temperature. The heated SMA actuator is located aft of the de-icing region to avoid melting the ice (which due to the ice's high heat of fusion, may have a greater power requirement) and it is insulated beneath and over the outside to conserve energy. Such a positioning allows a rapid enough cooling such that the next heating cycle can begin before too much new ice has accreted.

Preferably, NiTi is the choice of material for the riblet embodiments. It is known to those skilled in the art that NiTi alloys that can be heat-treated to exhibit the shape memory effect (SME), but if the material is cold worked as well by 20% to 40%, it is capable of sustaining elastic deformations of up to 4%, which is far greater than other flexible metals. This SMA property is known in the art as work hardened superelasticity, and this property is stable over a wide temperature range. Another type of SMA elasticity can be induced through heat treatments and is called pseudoelasticity. This type of elasticity can perform with up to an 8% strain with a minimal residual strain loss. However, this elasticity can only function over a limited temperature range. Another important advantage of the as-rolled NiTi material is that it has a lower modulus of elasticity than any other candidate metal, 5 msi to 10 msi. (steel: 30 msi, titanium: 16 msi, aluminum 10 msi). Because of this property, the metal can flex under less stress than the other metals, further improving de-icing performance. The NiTi alloy also possesses an extraordinarily high combination of corrosion, erosion, and abrasion resistance, key requirements for rotor-blade de-icers in particular.

It is understood that various modifications will be readily apparent to those skilled in the art without departing from the scope and spirit of the invention. Accordingly, it is not intended that the scope of the claims appended hereto be limited to the description set forth herein, but rather that the claims be construed as encompassing all the features of the patentable novelty that reside in the present invention, including all features that would be treated as equivalents thereof by those skilled in the art to which this invention pertains.

We claim:

1. A de-icing system comprising:

a support, at least a portion of which has a ribbed underlay structure;

a layer of substantially elastic material formed over said support at least a portion of which has of a ribbed underlay structure;

an actuator affixed at one location thereon to said support and at another location affixed thereon to said layer of substantially elastic material, said actuator when heated to a predetermined temperature substantially contracting so as to stretch said layer of substantially elastic material such that a corresponding portion thereof formed over said support at least a portion of which has a ribbed underlay structure conforms to the shape thereof, thereby shearing off ice accretion forming on said layer of substantially elastic material; and means for heating said actuator to said predetermined temperature.

2. The de-icing system of claim 1 wherein said layer of substantially elastic material is a shape memory alloy.

3. The de-icing system of claim 2 wherein said shape memory alloy is nickel titanium alloy.

4. The de-icing system of claim 1 wherein said actuator is a shape memory alloy.

5. The de-icing system of claim 4 wherein said shape memory alloy is nickel titanium alloy.

6. The de-icing system of claim 4 wherein said shape memory is prestrained so as to provide a restraining mechanism for returning said actuator to an uncontracted state.

7. The de-icing system of claim 4 wherein said snape memory alloy has a transformation temperature substantially higher thin the ambient air temperature.

8. The de-icing system of claim 4 wherein said shape memory alloy has a transformation temperature substantially coincident with the freezing temperature of water.

9. The de-icing system of claim 4 wherein said shape memory alloy exhibits a two-way shape memory action.

10. The de-icing system of claim 4 wherein said shape memory alloy includes wires formed to coincide with the areas between ribs of said ribbed underlay structure.

11. The de-icing system of claim 4 wherein said shape memory alloy includes a sheet having openings coincident with the areas between ribs of said ribbed underlay structure.

12. The de-icing system of claim 1 wherein said means for heating includes an electrical resistance heater.

13. The de-icing system of claim 1 wherein said at least portion of which has a ribbed underlay structure runs spanwise to said support.

14. The de-icing system of claim 1 wherein said at least portion of which has a ribbed underlay structure runs chordwise to said support.

15. The de-icing system of claim 1 wherein said actuator is of the electrothermal type.

16. A de-icing system comprising:

a support;

a substantially smooth elastic layer of shape memory alloy formed over said support;

an actuator affixed at one location thereon to said support and at another location affixed thereon to said substantially smooth elastic layer of shape memory alloy, said actuator when heated to a predetermine it temperature substantially contracting so as to stretch said substantially smooth elastic layer of shape memory alloy such that a corresponding portion thereof formed over said support conforms to the shape thereof, thereby shearing off ice accretion forming on said substantially smooth elastic layer of shape memory alloy; and means for heating said actuator to said predetermined temperature.

17. The de-icing system of claim 16 wherein said shape memory alloy is nickel titanium alloy.

18. The de-icing system of claim 16 wherein said actuator is a shape memory alloy.

19. The de-icing system of claim 18 wherein the shape memory alloy of said actuator is nickel titanium alloy.

20. The de-icing system of claim 18 wherein the shape memory alloy of said actuator is pre-strained so as to provide a restraining mechanism for returning said actuator to an uncontracted state.

21. The icing system of claim 18 wherein the shape memory alloy of said actuator has a transformation temperature substantially higher than the ambient air temperature.

22. The de-icing system of claim 18 wherein the shape memory alloy of said actuator has a transformation temperature substantially coinciding with the freezing temperature of water.

23. The de-icing system of claim 18 wherein the shape memory alloy of said actuator exhibits a two-way shape memory action.

24. The de-icing system of claim 16 wherein said means for heating comprises an electrical resistance heater.

25. The de-icing system of claim 16 wherein said actuator is of the electrothermal type.

* * * * *